(12) United States Patent  (10) Patent No.:  US 7,277,580 B2
Xu  (45) Date of Patent:  Oct. 2, 2007

(54) MULTIPLE THRESHOLDING FOR VIDEO FRAME SEGMENTATION

(75) Inventor: Xun Xu, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 772 days.

(21) Appl. No.: 10/319,145

(22) Filed: Dec. 12, 2002

(65) Prior Publication Data

US 2004/0114799 A1  Jun. 17, 2004

Related U.S. Application Data

(60) Provisional application No. 60/340,203, filed on Dec. 12, 2001, provisional application No. 60/340,204, filed on Dec. 12, 2001.

(51) Int. Cl.
*G06K 9/00*  (2006.01)
*G06K 9/34*  (2006.01)

(52) U.S. Cl. .................... 382/173; 382/103

(58) Field of Classification Search ............... 382/173
See application file for complete search history.

(56) References Cited

U.S. PATENT DOCUMENTS

| 4,550,435 | A | * | 10/1985 | Hayman ................ 382/103 |
| 5,339,092 | A | | 8/1994 | Johnson et al. |
| 5,907,626 | A | | 5/1999 | Toklu et al. |
| 5,926,190 | A | | 7/1999 | Turkowski et al. |
| 6,075,905 | A | | 6/2000 | Herman et al. |
| 6,181,805 | B1 | | 1/2001 | Koike et al. |
| 6,233,008 | B1 | * | 5/2001 | Chun ...................... 348/170 |
| 6,415,062 | B1 | * | 7/2002 | Moed et al. ............. 382/260 |
| 6,687,301 | B2 | * | 2/2004 | Moschetti ............ 375/240.16 |
| 6,771,834 | B1 | * | 8/2004 | Martins et al. ......... 382/257 |
| 6,819,796 | B2 | * | 11/2004 | Hong et al. ............ 382/173 |
| 7,006,686 | B2 | | 2/2006 | Hunter et al. |
| 2002/0071034 | A1 | * | 6/2002 | Ito et al. ............... 348/152 |

OTHER PUBLICATIONS

Sonka, et al., "Image Processing Analysis and Machine Vision", Chapman & Hall Computing Series, First Edition, 1993, pp. 422-443.

Haeberli, P., et al. "Automatic Panoramic Image Merging," Available: http://www.sgi.com/grafica/merge, pp. 1-3.

* cited by examiner

*Primary Examiner*—Wenpeng Chen
*Assistant Examiner*—Yuzhen Ge
(74) *Attorney, Agent, or Firm*—Blakely, Sokoloff, Taylor & Zafman LLP

(57) ABSTRACT

Intensity of each pixel in a source video frame is compared with intensities of one or more corresponding pixels in a reference video frame to calculate one or more intensity differences for each pixel in the source video frame. Further, a determination is made for each pixel in the source video frame, based on the intensity differences and multiple threshold sets, as to whether each pixel in the source video frame is a foreground pixel or a background pixel.

33 Claims, 16 Drawing Sheets

MULTIPLE THRESHOLDING FOR VIDEO FRAME SEGMENTATION

RELATED APPLICATIONS

This application is related to and claims the benefit of U.S. Provisional Patent application Ser. No. 60/340,203 filed Dec. 12, 2001, and U.S. Provisional Patent application Ser. No. 60/340,204 filed Dec. 12, 2001, which are hereby incorporated by reference.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2001, Sony Electronics, Inc., All Rights Reserved.

FIELD OF THE INVENTION

The invention relates to image processing in general. More particularly, the invention relates to video frame segmentation.

BACKGROUND OF THE INVENTION

Video frame segmentation is the process for breaking a video frame into a background scene and foreground objects. Typically, the video frame segmentation process involves the construction of a background mosaic. A background mosaic generates a complete still image of the background from video frames within a video shot. Specifically, in a video shot that has a static background scene and dynamic foreground objects, the foreground objects in certain frames may occlude some portions of the background. These occluded portions may be exposed in other frames when the foreground objects move in front of the background. A background mosaic combines the background scenes exposed in every frame. The quality of a background mosaic is considered to be sufficient if the mosaic includes each part of the background scene ever exposed in the shot or if foreground objects have been completely deleted from the mosaic.

Once a background mosaic is constructed, it can be used to segment each video frame into background and foreground regions by comparing the intensities of the corresponding pixels in the background mosaic and the video frame.

Video frame segmentation, and background mosaicking itself, can be used in many applications. One application is video compression. A video may be stored or transmitted in the form of a background mosaic together with frames of foreground regions. Compared with the transmission of every frame, the mosaic/foreground form may save significant storage space and reduce transmitting bandwidth. The background mosaic may also contribute to machine content understanding. For example, a "clean" background, without the foreground objects that may confuse the system, provides better indication of where the video was shot. The background mosaic may also facilitate video-editing for home or studio use.

SUMMARY OF THE INVENTION

Intensity of each pixel in a source video frame is compared with intensities of one or more corresponding pixels in a reference video frame to calculate one or more intensity differences for each pixel in the source video frame. Further, a determination is made for each pixel in the source video frame, based on the intensity differences and multiple threshold sets, as to whether each pixel in the source video frame is a foreground pixel or a background pixel.

DETAILED DESCRIPTION OF THE INVENTION

In the following detailed description of embodiments of the invention, reference is made to the accompanying drawings in which like references indicate similar elements, and in which is shown, by way of illustration, specific embodiments in which the invention may be practiced. These embodiments are described in sufficient detail to enable those skilled in the art to practice the invention, and it is to be understood that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Figure 1:
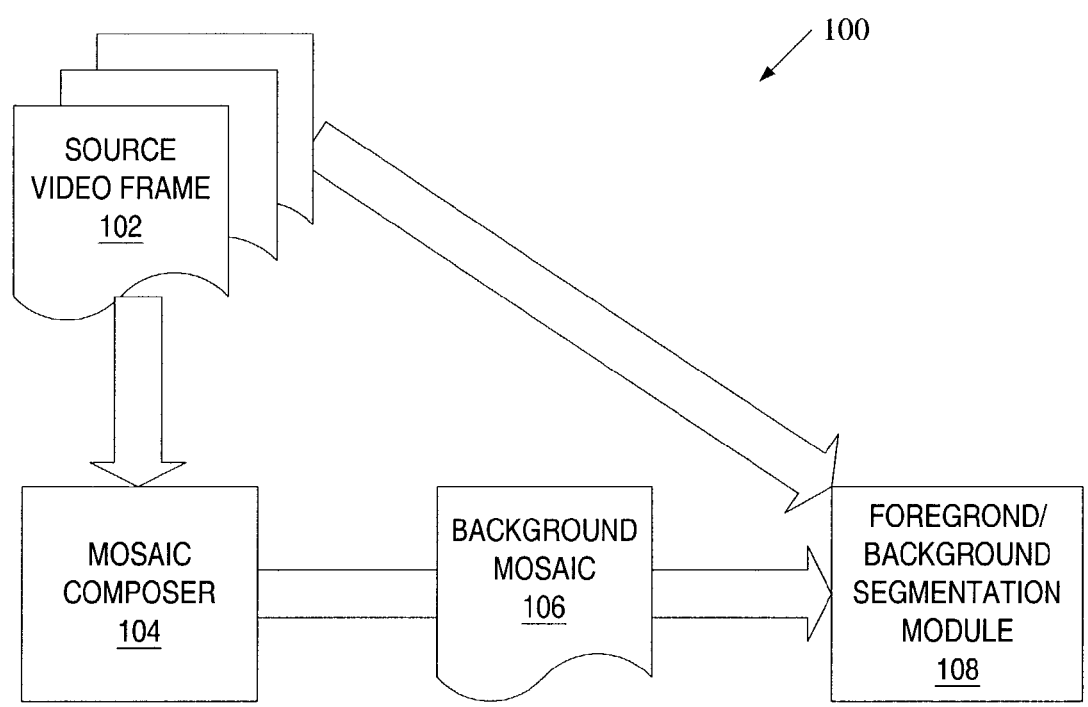
FIG. 1 is a block diagram of one embodiment of a video segmentation system.

Beginning with an overview of the operation of the invention, FIG. 1 illustrates one embodiment of a video segmentation system 100. The video segmentation system 100 includes a mosaic composer 104 and a foreground/background segmentation module 108. The mosaic composer 104 is responsible for creating a background mosaic 106 from multiple source video frames 102. In one embodiment, the multiple source video frames 102 represent a sequence of continuously-filmed or produced video frames generated by an imaging sensor such as a video camera, a digital still camera, an image sensor, etc. The sequence of video frames constitutes a video shot.

The background mosaic 106 is transferred to the foreground/background segmentation module 108 which is responsible for segmenting each source video frame 102 into background regions and foreground regions using the background mosaic 106.

In one embodiment, the mosaic composer 104 and the foreground/background segmentation module 108 reside on a single computer system. In another embodiment, the mosaic composer 104 and the foreground/background segmentation module 108 reside on different computer systems coupled to each other directly or via a network (e.g., a local area network or a wide area network).

In one embodiment, the mosaic composer 104 defines intensity of each pixel in the background mosaic 106 by collecting intensity values of corresponding pixels in source video frames 102 and selecting an intensity value associated with the majority of the corresponding pixels, as will be discussed in more detail below.

In one embodiment, the foreground/background segmentation module 108 performs segmentation of each source video frame 102 using multiple sets of thresholds as will be discussed in greater detail below.

Figure 2:
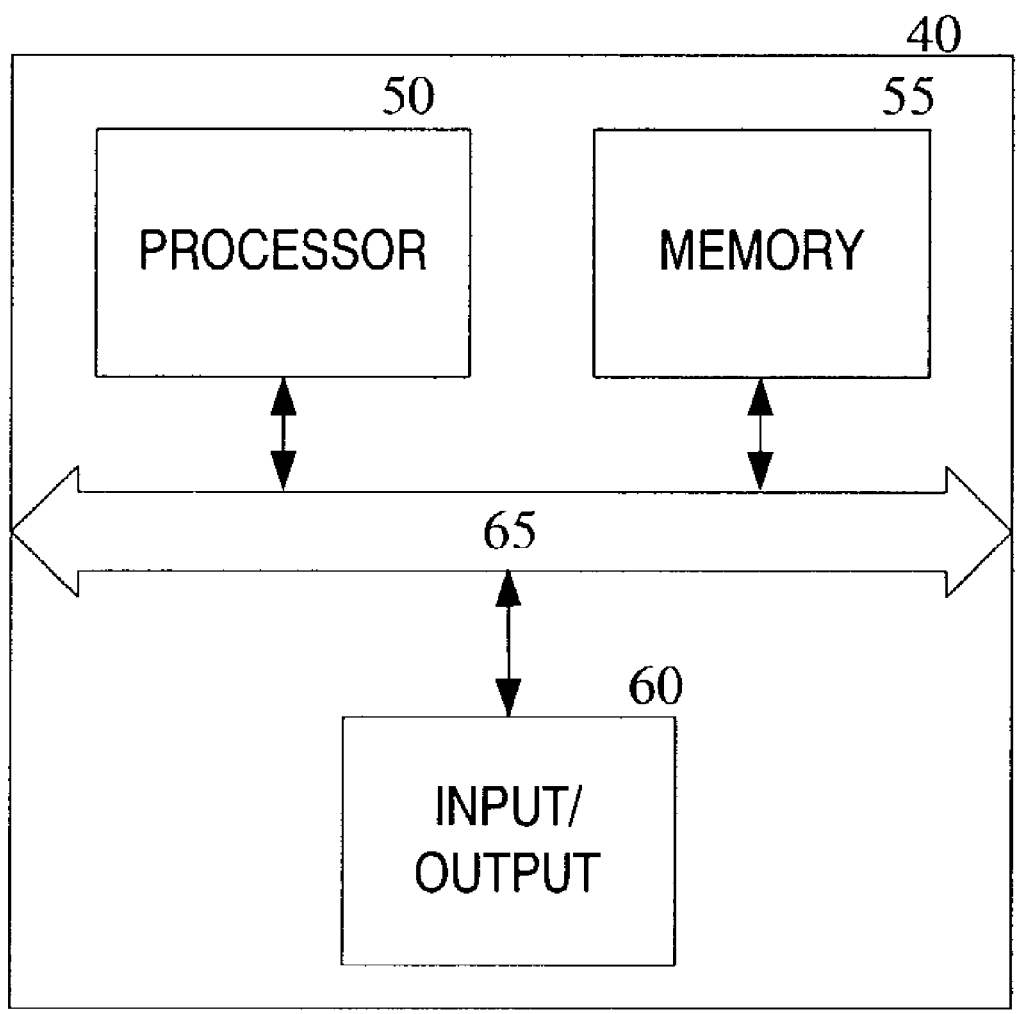
FIG. 2 is a block diagram of a computer environment suitable for practicing the invention.

The following description of FIG. 2 is intended to provide an overview of computer hardware and other operating components suitable for implementing the invention, but is not intended to limit the applicable environments. FIG. 2 illustrates one embodiment of a computer system suitable for use as a mosaic composer 104 or a foreground/background segmentation module 108 of FIG. 1.

The computer system 40 includes a processor 50, memory 55 and input/output capability 60 coupled to a system bus 65. The memory 55 is configured to store instructions which, when executed by the processor 50, perform the methods described herein. Input/output 60 also encompasses various types of computer-readable media, including any type of storage device that is accessible by the processor 50. One of skill in the art will immediately recognize that the term "computer-readable medium/media" further encompasses a carrier wave that encodes a data signal. It will also be appreciated that the system 40 is controlled by operating system software executing in memory 55. Input/output and related media 60 store the computer-executable instructions for the operating system and methods of the present invention. The mosaic composer 104 or the foreground/background segmentation module 108 shown in FIG. 1 may be a separate component coupled to the processor 50, or may be embodied in computer-executable instructions executed by the processor 50. In one embodiment, the computer system 40 may be part of, or coupled to, an ISP (Internet Service Provider) through input/output 60 to transmit or receive image data over the Internet. It is readily apparent that the present invention is not limited to Internet access and Internet web-based sites; directly coupled and private networks are also contemplated.

It will be appreciated that the computer system 40 is one example of many possible computer systems that have different architectures. A typical computer system will usually include at least a processor, memory, and a bus coupling the memory to the processor. One of skill in the art will immediately appreciate that the invention can be practiced with other computer system configurations, including multiprocessor systems, minicomputers, mainframe computers, and the like. The invention can also be practiced in distributed computing environments where tasks are performed by remote processing devices that are linked through a communications network.

Figure 3:
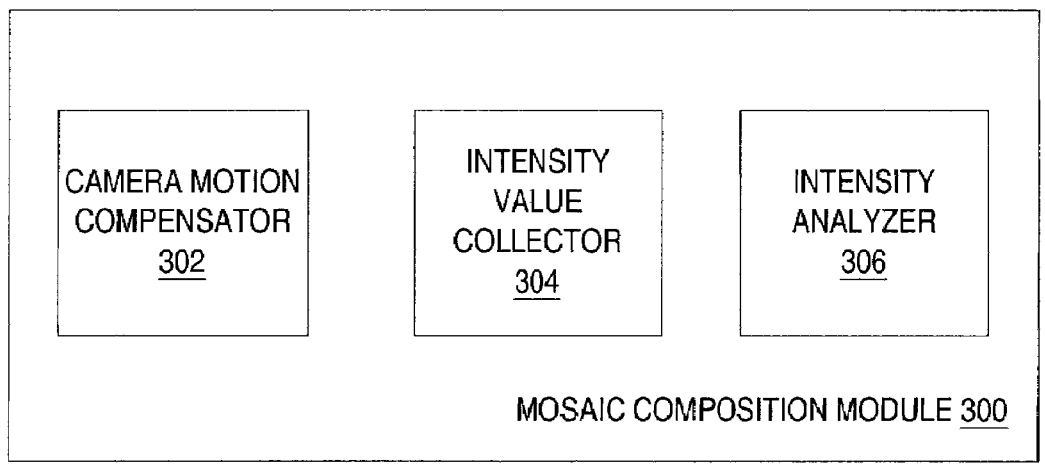
FIG. 3 is a block diagram of one embodiment of a mosaic composition module.

The composition of a background mosaic will now be described in more detail. FIG. 3 is a block diagram of one embodiment of a mosaic composition module 300 such as a mosaic composer 104 of FIG. 1.

Referring to FIG. 3, the mosaic composition module 300 includes a camera motion compensator 302, an intensity value collector 304 and an intensity analyzer 306. The motion compensator 302 is responsible for finding and performing a geometrical transformation (known as warping), which, after being applied to all of the source video frames, brings them into a common coordinate system. The warping is performed to compensate for video motion. For example, during the use of a video camera, a user may introduce camera motions, such as pan, tilt, zoom and rotation, into a video shot. The motion compensator 302 estimates the background (camera) motions and warps each source video frame, compensating for the background motion. As a result, corresponding pixels in the warped video frames represent the same background scene point, unless foreground objects occlude that scene point in some of the frames.

The intensity value collector 304 is responsible for collecting intensity values of contributing pixels for each pixel in the background mosaic being build. The contributing pixels are pixels in the source video frames that correspond to the specific pixel in the background mosaic. As will be discussed in more detail below, in one embodiment, the intensity value collector 304 constructs, for each pixel in the background mosaic, a voting array with multiple cells representing different intensity values and adds votes of contributing pixels to the array's cells that represent intensity values of the contributing pixels.

The intensity analyzer 306 is responsible for analyzing the collected intensity values and selecting an intensity value associated with the majority of the contributing pixels. The selected intensity value defines the intensity of the corresponding pixel in the background mosaic. In one embodiment, in which the collected intensity values are presented in the form of a voting array, the intensity analyzer 306 finds a cell with the maximum number of votes in the voting array and uses the intensity value represented by this cell for the mosaic pixel.

Next, the particular methods of the invention are described with reference to flow diagrams in FIGS. 4-6 that illustrate processes performed by the mosaic composition module 300. The processes may be performed by processing logic that may comprise hardware (e.g., circuitry, dedicated logic, etc.), software (such as run on a general purpose computer system or a dedicated machine), or a combination of both. For software-implemented processes, the description of a flow diagram enables one skilled in the art to develop such programs including instructions to carry out the processes on suitably configured computers (the processor of the computer executing the instructions from computer-readable media, including memory). The computer-executable instructions may be written in a computer programming language or may be embodied in firmware logic. If written in a programming language conforming to a recognized standard, such instructions can be executed on a variety of hardware platforms and for interface to a variety of operating systems. In addition, the embodiments of the present invention are not described with reference to any particular programming language. It will be appreciated that a variety of programming languages may be used to implement the teachings described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or produce a result. It will be appreciated that more or fewer operations may be incorporated into the processes illustrated in FIGS. 4-6 without departing from the scope of the invention and that no particular order is implied by the arrangement of blocks shown and described herein.

Figure 4:
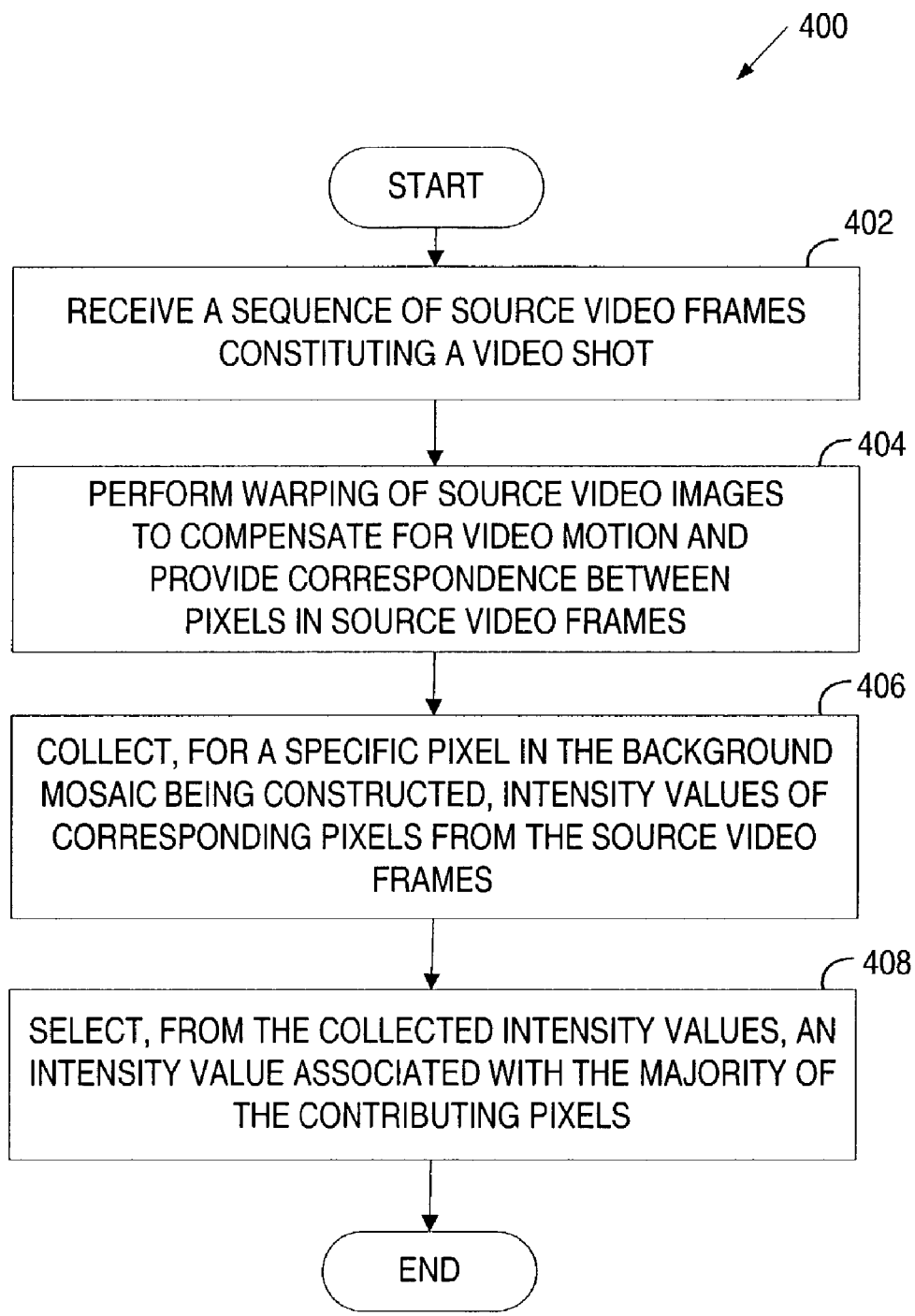
FIG. 4 is a flow diagram of one embodiment of a method for constructing a video background mosaic.
Figure 5:
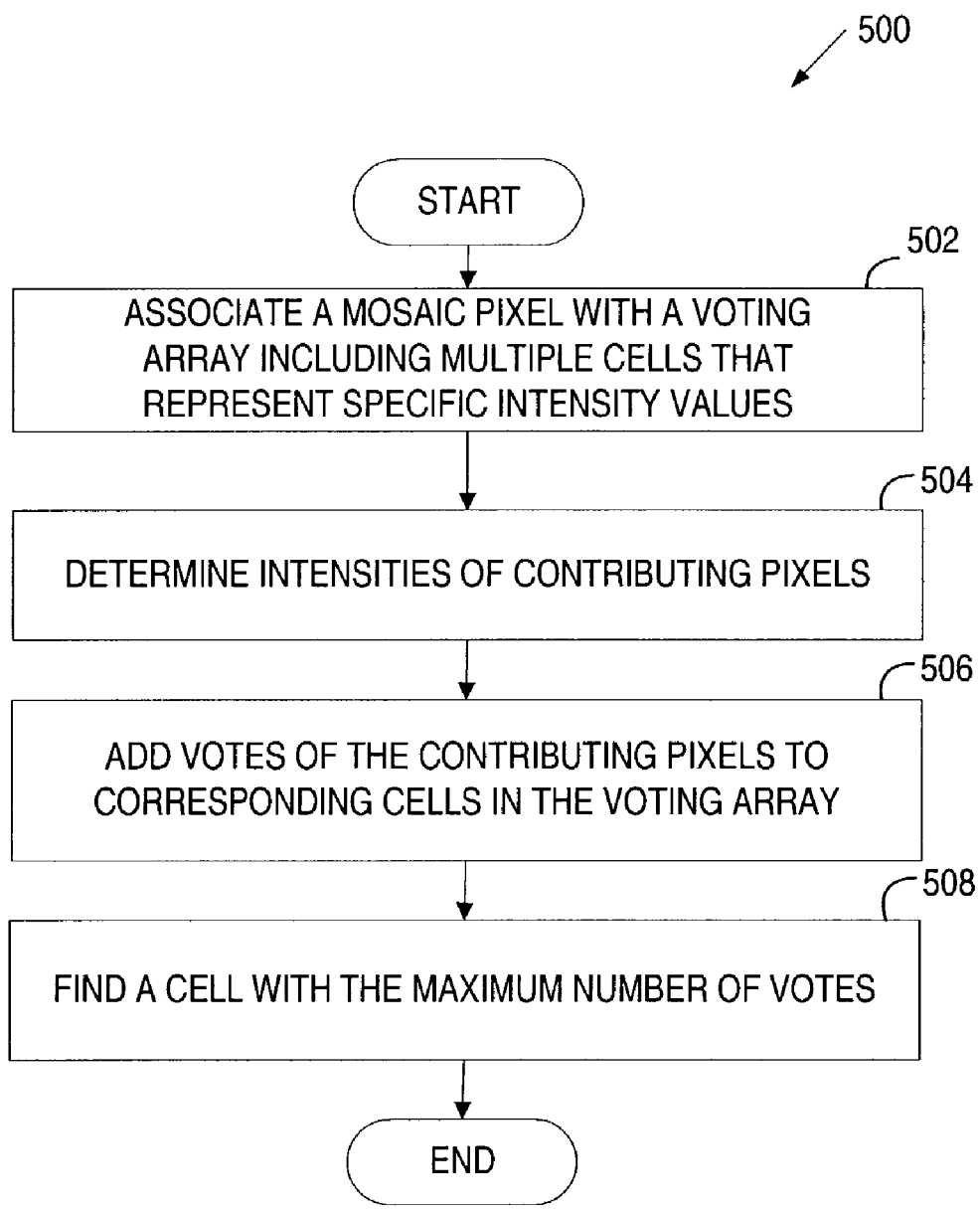
FIG. 5 is a flow diagram of one embodiment of a method for determining intensity of a pixel in a video background mosaic composed from grayscale video frames.

FIG. 4 is a flow diagram of one embodiment of a method 400 for constructing a video background mosaic. At processing block 402, processing logic receives a sequence of source video frames constituting a video shot. At processing block 404, processing logic performs warping of the source video images to compensate for video motion and provide correspondence between the pixels in the source video frames.

At processing block 406, processing logic collects, for a specific pixel in the background mosaic being constructed, intensity values of corresponding pixels from the source video frames. At processing block 408, processing logic selects, from the collected intensity values, an intensity value associated with the majority of the contributing pixels. The selected intensity value defines intensity of the pixel in the background mosaic. Processing blocks 406 and 408 are performed for each pixel in the background mosaic.

Thus, method 400 utilizes intensity of the majority of the contributing pixels for each pixel in the background mosaic. As compared to the background mosaicking utilizing intensity of a pixel from a specific video frame (e.g., a first or last video frame in the sequence) or the average intensity of the contributing pixels, the approach of method 400 is robust against the interference of foreground objects. Specifically, the use of intensity from a specific video frame or the use of the average of all contributing intensities cannot prevent the foreground objects from entering the background mosaic because it is possible that foreground objects can contaminate the intensity of the pixel in the specific frame or the intensity average. The approach of method 400 minimizes this possibility by ignoring intensities of pixels that are in the minority and as such might have been occluded by a foreground object and, instead, selecting the intensity of the dominant number of pixels that is likely to correspond to the exposed background scene, given the static nature of the background scene and the dynamic nature of the foreground objects.

In one embodiment, intensity of the majority of contributing pixels is determined (processing blocks 406 and 408) using a voting mechanism. FIG. 5 is a flow diagram of one embodiment of a method 500 that utilizes a voting mechanism to determine intensity of a pixel in a video background mosaic composed from grayscale video frames. At processing block 502, processing logic associates a mosaic pixel with a voting array including multiple cells that represent specific intensity values. At processing block 504, processing logic determines intensities of contributing pixels, i.e., corresponding pixels from the video frames in the video shot. At processing block 506, processing logic adds votes of the contributing pixels to corresponding cells in the voting array. In one embodiment, each contributing pixel is assigned one vote. Alternatively, the contributing pixels may have different number of votes depending on their location in the frame (e.g., closer or further from the center of the frame) or some other parameters.

In one embodiment, processing logic performs preliminary segmentation prior to adding votes of the contributing pixels to corresponding cells in the voting array. Preliminary segmentation provides an initial breaking of video frames into foreground and background regions. When collecting votes, in one embodiment, processing logic skips pixels from the foreground regions. In another embodiment, processing logic assigns a smaller number of votes to pixels in the foreground regions. In one embodiment, the preliminary segmentation is estimated by analyzing the image motions. Although the preliminary segmentation results are usually noisy, they help relieve the constraint that the background scene should be sufficiently exposed at each mosaic pixel.

At processing block 508, processing logic finds a cell with the maximum number of votes. The intensity value associated with this cell is used to define intensity of the pixel in the background mosaic.

Figure 7:
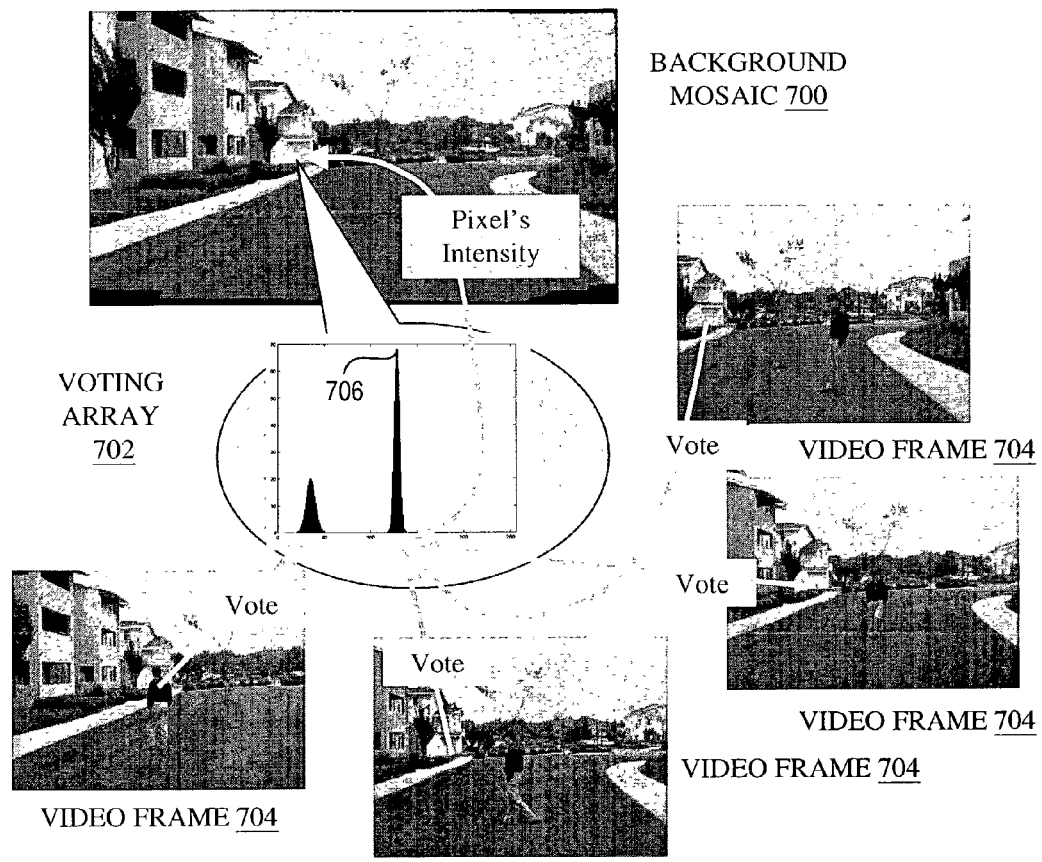
FIG. 7 illustrates one embodiment of voting-based background mosaicking for grayscale video frames.

FIG. 7 illustrates one embodiment of a voting-based background mosaicking method 500 for grayscale video frames. As shown, a pixel in the background mosaic 700 is associated with a voting array 702 having 256 cells corresponding to 0-255 discrete grayscale. Contributing grayscale intensity generates a vote cast in the corresponding cell. For example, if the contributing pixel of a certain video frame 704 corresponds to a background scene point, which has a grayscale intensity of 125, cell number 125 receives a vote. If the frame warping is accurate and no occlusion happens to this pixel along the video shot, cell 125 may collect all the votes. If at certain frames the occlusion happens, foreground object intensities are contributed, and the votes are cast in other cells of the voting array 702. However, due to the dynamic nature of foreground objects, the occlusion is unlikely to stay long, and the background scene will probably receive sufficient exposure at this scene point throughout the video shot, resulting in the collection of the majority of votes in the cell that describes the background scene's intensity. The majority of votes is illustrated by peak 706 in the voting array 702.

In an alternative embodiment, a sequence of video frames consists of color frames. For a color frame, the intensity of a mosaic pixel has three components (e.g., red, green and blue ("RGB"), or luminance, chroma blue and chroma red ("YCbCr"). For each component, a separate voting array is created and associated with a pixel in the background mosaic. That is, the voting-based background mosaicking method 500 is performed separately in each of the three components.

In one embodiment, a single voting array is replaced by a hierarchy of voting arrays for each mosaic pixel to reduce the memory consumption. For example, if each voting cell takes two bytes of memory, the voting arrays required for the mosaic of a color video having a size of 1024×1024 may occupy 3×256×1024×1024×2=1.5 Gbyte of memory. As will be understood from the discussion below, the use of a voting array hierarchy can provide significant reduction of memory consumption.

Figure 6:
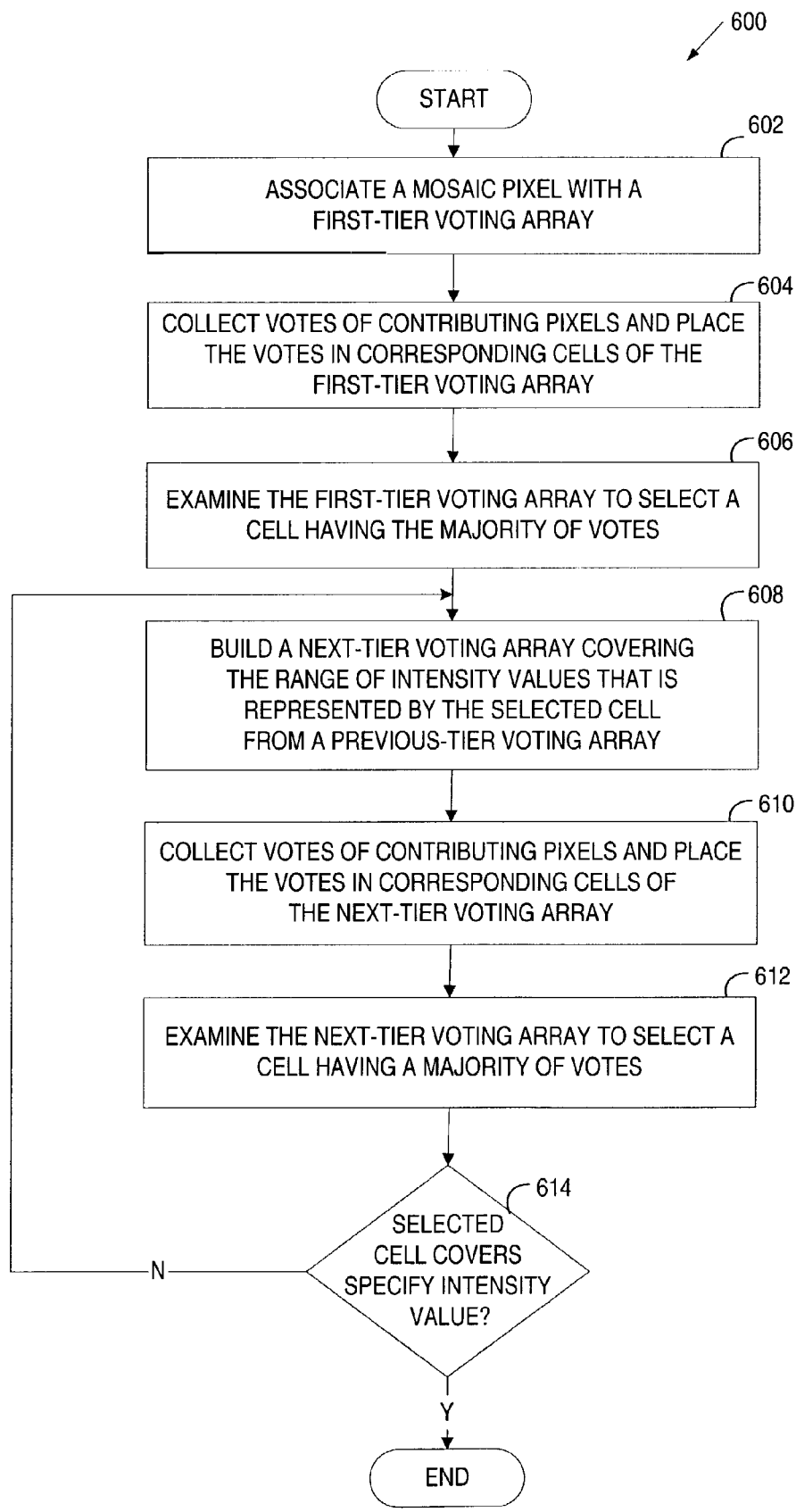
FIG. 6 is a flow diagram of one embodiment of a method for determining intensity of a pixel in a video background mosaic using a hierarchy of voting arrays.

FIG. 6 is a flow diagram of one embodiment of a method 600 for determining intensity of a pixel in a video background mosaic using a hierarchy of voting arrays. At processing block 602, processing logic associates a mosaic pixel with a first-tier voting array (processing block 602). Each cell of the first-tier voting array covers a specific range of intensity values. For example, for 0-255 discrete grayscale, the first-tier voting array may have 7 cells, with each cell covering a range of 37 intensity values (e.g., from 0 to 36, from 37 to 73, etc.).

At processing block 604, processing logic collects votes of contributing pixels and places the votes in corresponding cells of the first-tier voting array. Next, processing logic examines the first-tier voting array to select a cell having the majority of votes (processing block 606) and builds a next-tier voting array covering the range of intensity values that is represented by the selected cell from a previous-tier voting array, i.e., the first-tier voting array (processing block 608). The next-tier voting array has a number of cells, with each cell covering a specific range of intensity values or a specific intensity value. In the example above, if the first cell had the majority of votes, the next-tier voting array covers intensity values from 0 to 36 and includes 7 cells, with each cell covering a range of 6 intensity values.

At processing block 610, processing logic collects votes of contributing pixels and places the votes in corresponding cells of the next-tier voting array. Next, processing logic examines the next-tier voting array to select a cell having the majority of votes (processing block 612). Further, processing logic determines whether the selected cell covers a specific intensity value or a range of intensity values (decision box 614). If the selected cell covers a specific intensity value, this value is used for the mosaic pixel, and method 600 ends. Alternatively, if the selected cell covers a range of intensity values, method 600 returns to processing block 608 and continues until the determination made at decision box 614 becomes positive.

Figure 8:
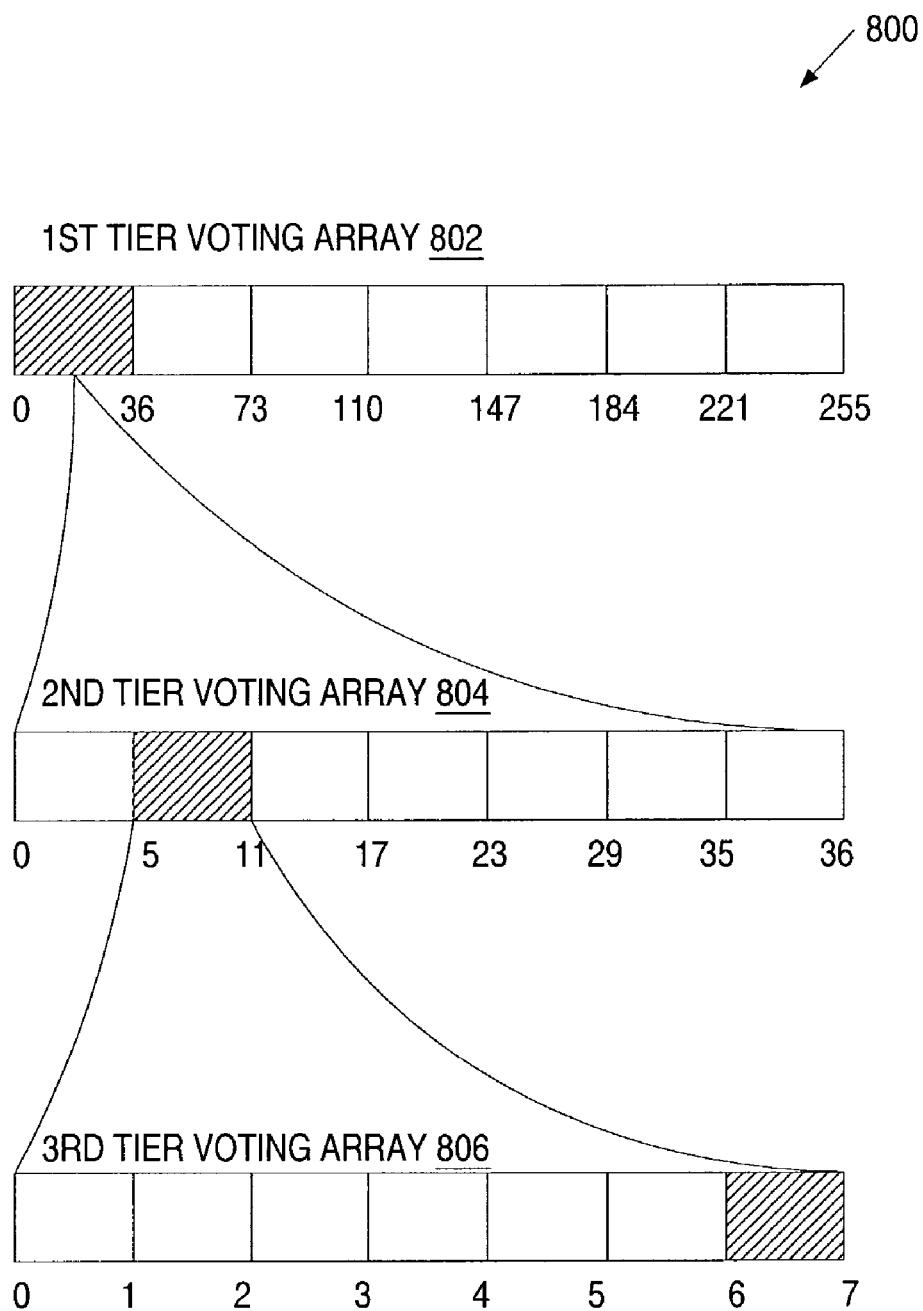
FIG. 8 illustrates one embodiment of a background mosaicking process utilizing a hierarchy of voting arrays.

FIG. 8 illustrates one embodiment of a background mosaicking method 600 utilizing a hierarchy of voting arrays 800. The hierarchy consists of three voting arrays. A first-tier voting array 802 is a 7 cell voting array, mapping the 0-255 grayscale space at a coarse resolution. After the first voting is completed, the cell with the highest number of votes defines a segment in the 0-255 grayscale space. This segment is mapped to a second-tier voting array 804 at a finer resolution, and the voting procedure is repeated, resulting in a new segment in the 0-255 grayscale space. This new segment is mapped to a third-tier voting array 806. Repeating the voting procedure for one more time, we arrive at the accuracy of 256 cell array.

The hierarchical voting array approach illustrated in FIG. 8 reduces the memory consumption by 97 percent. Specifically, to construct the color 1024×1024 mosaic, the total memory occupied by the voting arrays is 3×7×2×1024× 1024=42 Mbyte, as compared to 1.5 Gbytes calculated above.

Video frame segmentation will now be described in more detail. The video frame segmentation process begins with creating a reference frame for a source video frame. In one embodiment, the reference frame is created by warping a background mosaic (e.g., a background mosaic composed by a voting-based mosaicking process or any other mosaicking process) based on the background motion known at the source video frame. Then, the intensities of corresponding pixels in the reference frame and the source video frame are compared using predefined thresholds. If the intensity difference is below the thresholds, the pixel in the source video frame is declared to be a background pixel. Otherwise, the pixel in the source video frame is declared to a foreground pixel.

The selection of threshold values has a direct impact on classification results. For example, if the thresholds are loose, some foreground regions may be classified as background regions because the intensity difference of these regions is not large enough compared to the loose thresholds. On the contrary, if the thresholds are tight, some background regions may be classified as foreground. For example, different video frames might record the same background scene point with different intensities because of different lightning condition and the automatic white balance and gain control of the video camera. In addition, if the background mosaic is constructed on the contributions from multiple video frames, there usually exists some natural difference between the intensities of the background pixels in the reference frame and the video frame. If the tight thresholds pick up this natural intensity difference, misclassification happens.

Figure 9:
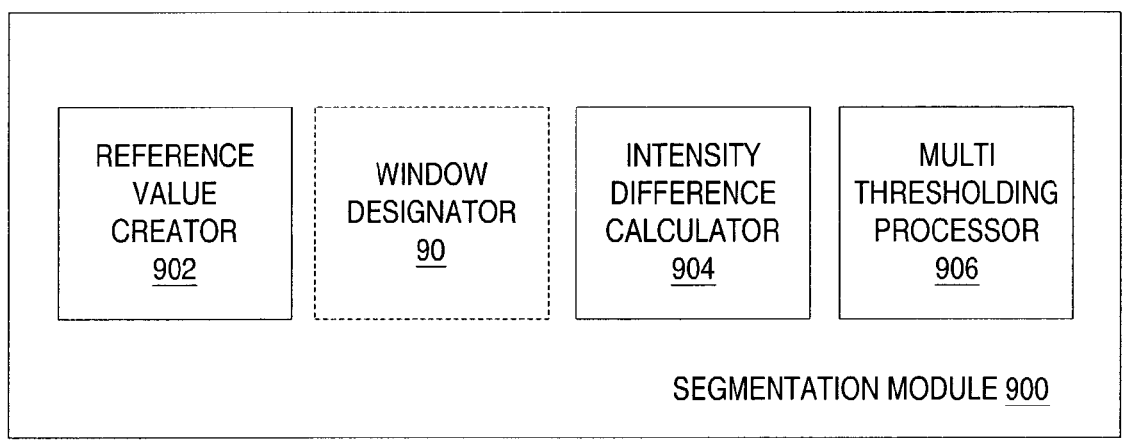
FIG. 9 is a block diagram of one embodiment of a segmentation module that employs a multi-thresholding scheme.

One embodiment of the present invention utilizes a multi-thresholding scheme to avoid potential problems discussed above. FIG. 9 is a block diagram of one embodiment of a segmentation module (such as a foreground/background segmentation module 108 of FIG. 1) that employs a multi-thresholding scheme.

Referring to FIG. 9, the segmentation module 900 includes a reference frame creator 902, an intensity difference calculator 904 and a multi-thresholding processor 906. The reference frame creator is responsible for creating a reference frame for a source video frame being segmented. In one embodiment, the reference frame is created by warping a background mosaic based on the background motion known at the source. As a result, the reference frame looks like the source video frame, except that it has no foreground objects. The intensity difference calculator 904 is responsible for comparing intensities of pixels in the source video frame with intensities of corresponding pixels in the reference frame and generating intensity differences.

The multi-thresholding processor 906 is responsible for performing foreground/background classifications of the pixels in the source video frame using the intensity differences and multiple sets of thresholds. The multiple sets of thresholds allow varying intensity differences, resulting in multiple classification results that are used to create a final foreground/background segmentation of the source video frame, as will be discussed in more detail below.

In one embodiment, the segmentation module 900 also includes an optional window designator 908 that is responsible for defining a window in the reference frame for each pixel in the source video frame. For example, in order to classify pixel (x,y) in the source video frame, a square window centered at (x,y) is defined in the reference frame. The intensity difference calculator 904 then performs the intensity subtraction between pixel (x,y) in the source video frame and all the reference frame pixels in the square window centered at (x,y). Further, when the multi-thresholding processor 906 evaluates the intensity differences using any of the multiple threshold sets, it classifies pixel (x,y) as a background pixel candidate if it finds at least one intensity difference that is below the corresponding threshold set. Otherwise, the multi-thresholding processor 906 classifies pixel (x,y) as a foreground pixel candidate.

Next, the particular methods of the invention are described with reference to flow diagrams in FIGS. 10-15 that illustrate processes performed by the segmentation module 900. The processes may be performed by processing logic that may comprise hardware (e.g., circuitry, dedicated logic, etc.), software (such as run on a general purpose computer system or a dedicated machine), or a combination of both. For software-implemented processes, the description of a flow diagram enables one skilled in the art to develop such programs including instructions to carry out the processes on suitably configured computers (the processor of the computer executing the instructions from computer-readable media, including memory). The computer-executable instructions may be written in a computer programming language or may be embodied in firmware logic. If written in a programming language conforming to a recognized standard, such instructions can be executed on a variety of hardware platforms and for interface to a variety of operating systems. In addition, the embodiments of the present invention are not described with reference to any particular programming language. It will be appreciated that a variety of programming languages may be used to implement the teachings described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or produce a result. It will be appreciated that more or fewer operations may be incorporated into the processes illustrated in FIGS. 10-15 without departing from the scope of the invention and that no particular order is implied by the arrangement of blocks shown and described herein.

Figure 10:
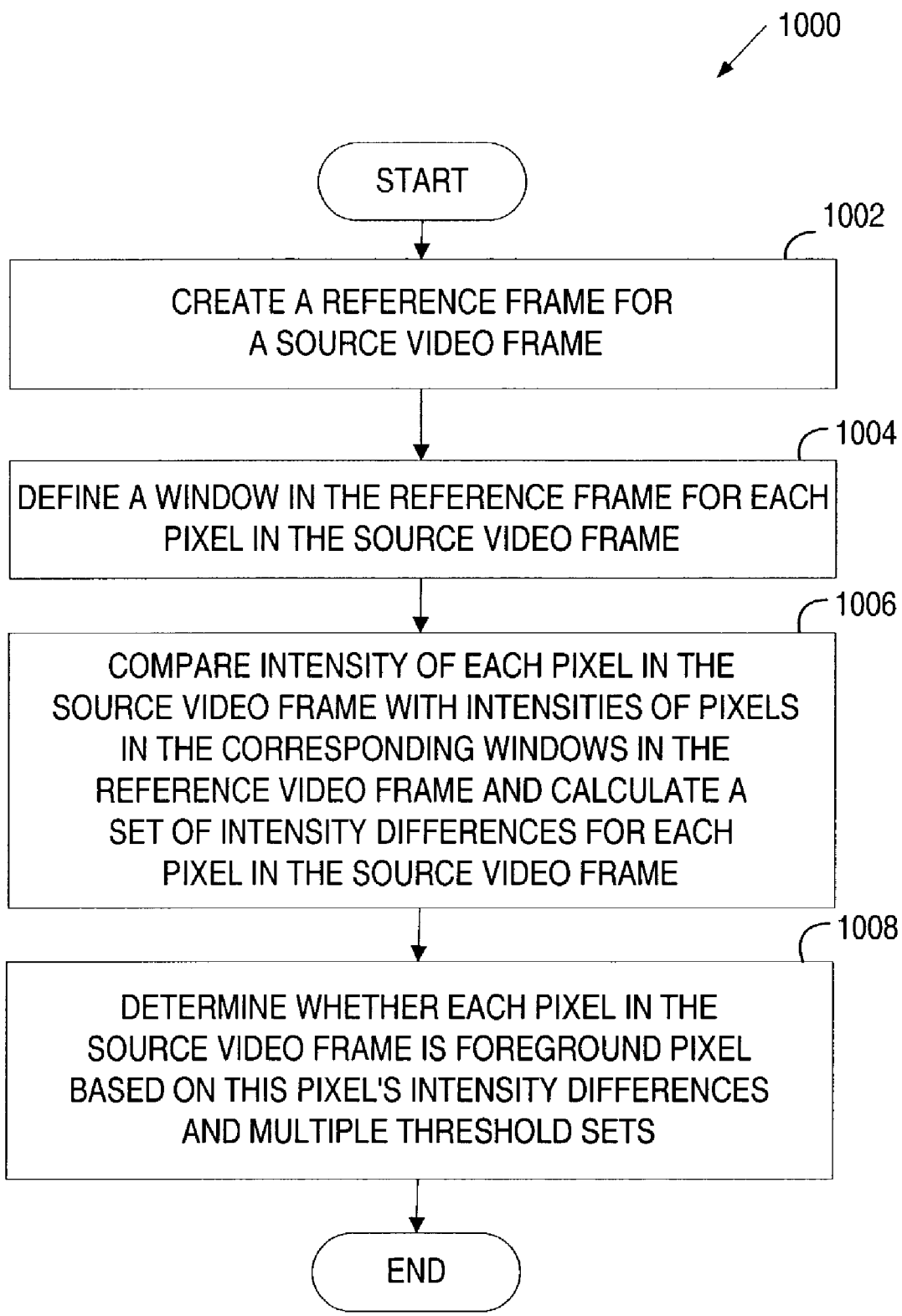
FIG. 10 is a flow diagram of one embodiment of a method for performing segmentation of a source video frame.

FIG. 10 is a flow diagram of one embodiment of a method 1000 for performing segmentation of a source video frame. At processing block 1002, processing logic creates a reference frame that is identical to the source video frame, except that it has no foreground objects that may be present in the source video frame.

At processing block 1004, processing logic defines a window in the reference frame for each pixel in the source video frame. As discussed above, the window is centered at the position of the source video frame's pixel for which this window is defined. The window-based approach provides better accuracy by covering a larger number of potential matches. Specifically, due to the motion information imperfection, a background pixel positioned at a certain location in the source video frame usually matches a reference frame pixel that is located in a neighborhood centered at the location of the background pixel. The window-based matching enables the system to pick up the matches in this neighborhood. If the background mosaic is "clean" enough, a foreground pixel does not have much chance to find a match in the window, and is therefore classified as a foreground pixel candidate. The size of the window determines the system's tolerance of motion information imperfection. The larger the window size, more motion error is tolerated, and more computation time is spent on the frame comparing. Thus, the window size is defined by balancing accuracy concerns against computation intensity concerns for each specific application.

At processing block 1006, processing logic compares intensity of each pixel in the source video frame with intensities of pixels in the corresponding windows in the reference video frame and calculates a set of intensity differences for each pixel in the source video frame.

Further, at processing block 1008, processing logic determines whether each pixel in the source video frame is a foreground pixel based on this pixel's intensity differences and multiple threshold sets. The multiple sets of thresholds include two or more sets of thresholds that allow varying intensity differences, resulting in multiple classification results that are then used to create a final foreground/background segmentation of the source video frame.

In one embodiment, three sets of thresholds are used for video frame segmentation of a grayscale video frame: a set of thresholds referred to as loose thresholds that allow a larger intensity difference between the reference frame and the source video frame, a set of thresholds referred to as tight thresholds that allow a smaller intensity difference, and a set of thresholds referred to as medium thresholds that allow an intensity difference in between the above two intensity differences.

For color videos, the intensity comparing is performed in multiple channels of the color space (e.g., YCbCr color space). In one embodiment, three sets of thresholds are used for each of the channels. In one embodiment, for YCbCr color space, the thresholds on Cb and Cr channels are much tighter than the thresholds on the Y channel. The consideration behind this is that, compared to Cb and Cr channel, the Y channel is more sensitive to the lightening variation and the camera's automatic gain control. Therefore, it needs a more forgiving threshold to tolerate the natural intensity difference.

Figure 11:
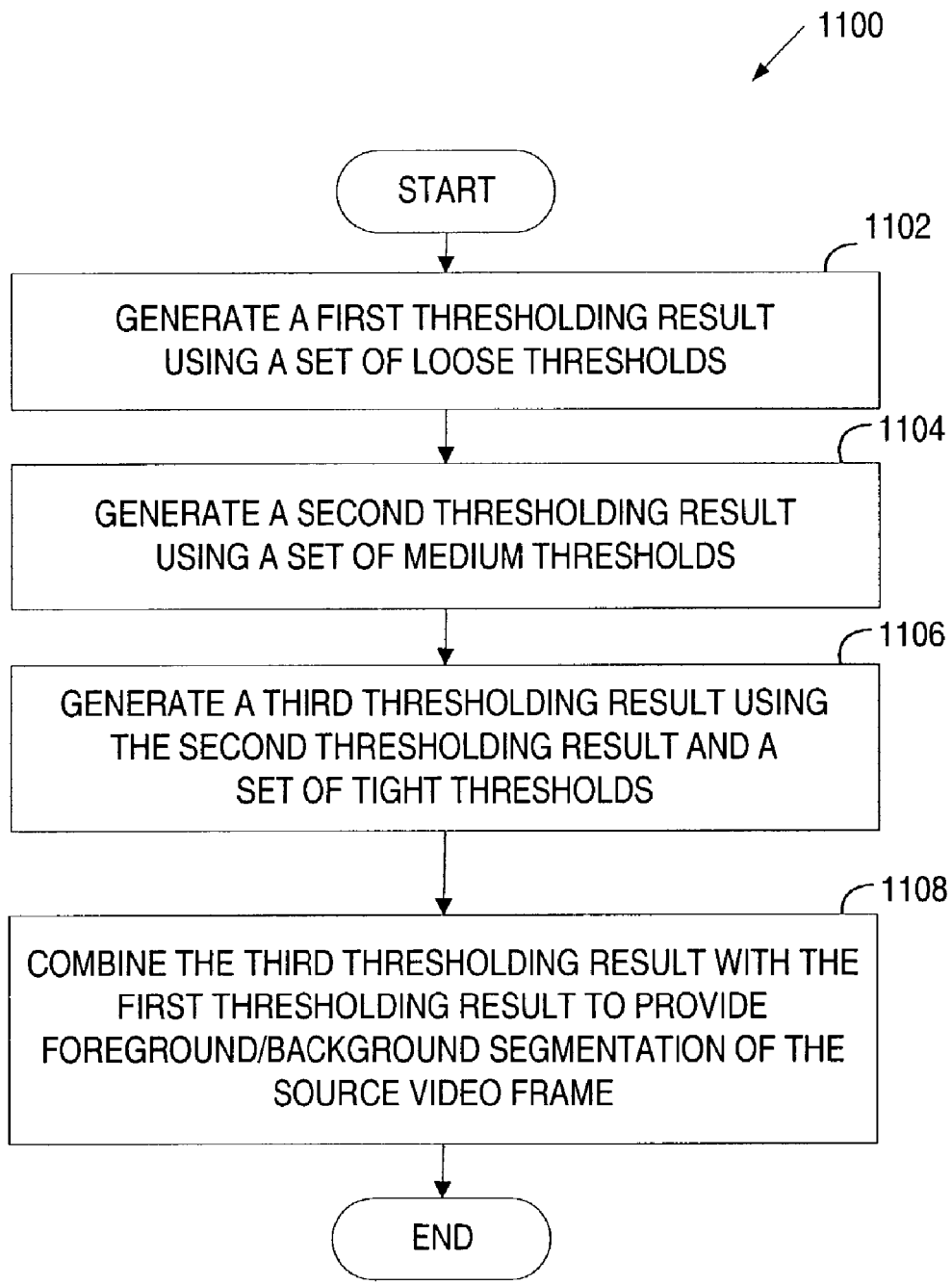
FIG. 11 is a flow diagram of one embodiment of a method for performing video frame segmentation using three sets of thresholds.

FIG. 11 is a flow diagram of one embodiment of a method 1100 for performing video frame segmentation using three sets of thresholds. Method 1100 begins with processing logic generating a first thresholding result using a set of loose thresholds (processing block 1102). One embodiment of this generation process is discussed in greater detail below in conjunction with FIG. 12.

At processing block 1104, processing logic generates a second thresholding result using a set of medium thresholds. One embodiment of a method for generating the second thresholding result is discussed in greater detail below in conjunction with FIG. 13.

At processing block 1106, processing logic generates a third thresholding result using the second thresholding result and a set of tight thresholds. One embodiment of a method for generating the third thresholding result will be discussed in more detail below in conjunction with FIG. 14.

Afterwards, processing logic combines the third thresholding result with the first thresholding result to provide foreground/background segmentation of the source video frame (processing block 1108). One embodiment of a method for combining the thresholding results is discussed in more detail below in conjunction with FIG. 15.

Figure 12:
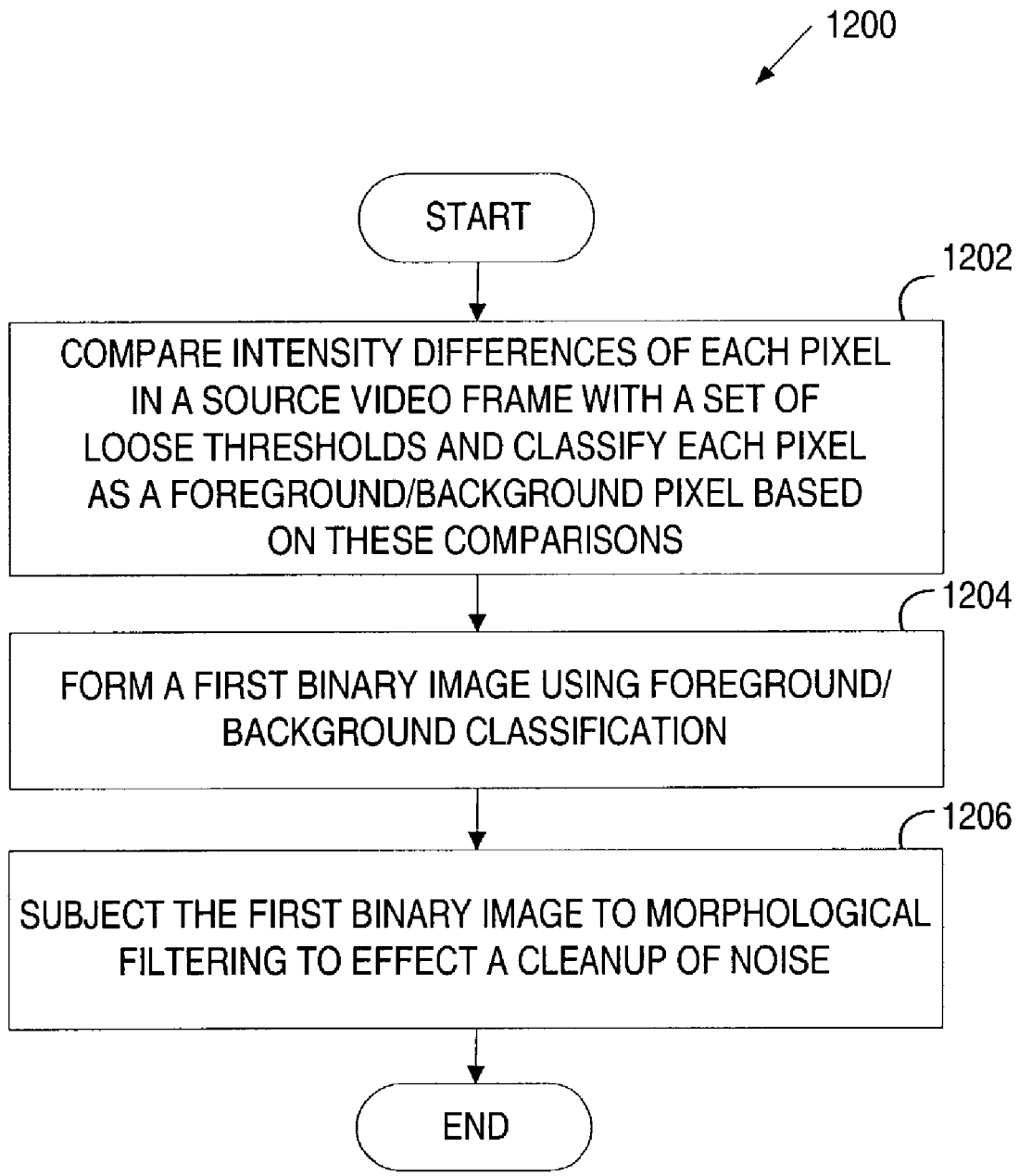
FIG. 12 is flow diagram of one embodiment of a method for generating a first thresholding result using a set of loose thresholds.

FIG. 12 is flow diagram of one embodiment of a method 1200 for generating a first thresholding result using a set of loose thresholds. Method 1200 begins with processing logic comparing intensity differences of each pixel in the source video frame with a set of loose thresholds and classifying each pixel as a foreground/background pixel based on these comparisons (processing block 1202). Processing logic classifies each pixel in the source video frame as a background pixel if at least one of its intensity differences is below the set of loose thresholds. Otherwise, it classifies this pixel as a foreground pixel.

At processing block 1204, processing logic forms a first binary image using this foreground/background classification. Next, in one embodiment, at processing block 1206, processing logic subjects the first binary image to morphological filtering to effect cleanup of noise. The resulting binary image may include one or more foreground candidate regions that constitute the first thresholding result.

Figure 13:
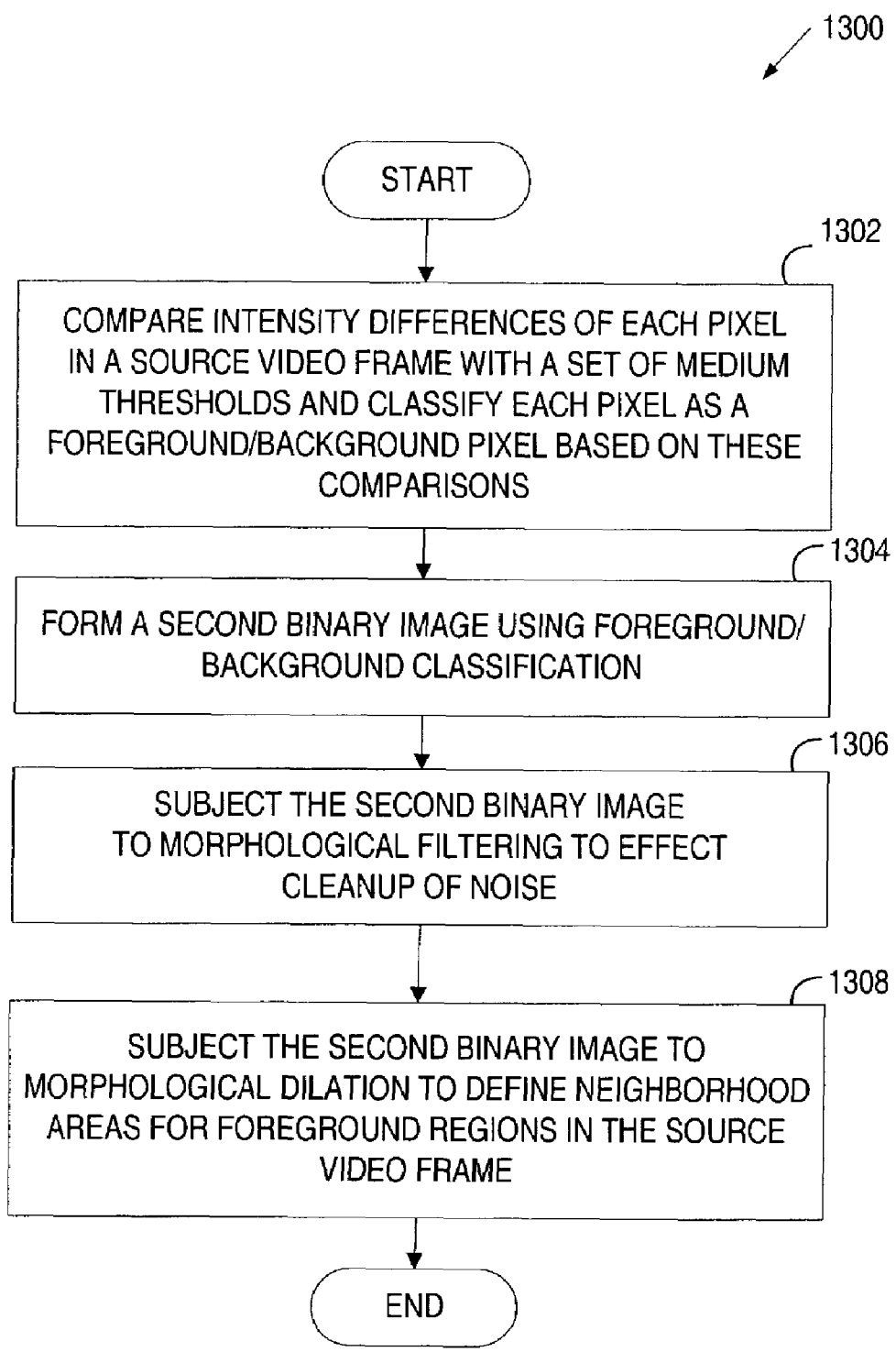
FIG. 13 is flow diagram of one embodiment of a method for generating a second thresholding result using a set of medium thresholds.

FIG. 13 is flow diagram of one embodiment of a method 1300 for generating a second thresholding result using a set of medium thresholds. Method 1300 begins with processing logic comparing intensity differences of each pixel in the source video frame with a set of medium thresholds and classifying each pixel as a foreground/background pixel based on these comparisons (processing block 1302). Next, processing logic forms a second binary image using this foreground/background classification (processing block 1304) and, in one embodiment, subjects the second binary image to morphological filtering to effect cleanup of noise (processing block 1306).

Further, processing logic subjects the second binary image to morphological dilation to define neighborhood areas for foreground regions in the source video frame (processing block 1308). The resulting neighborhood areas constitute the second thresholding result.

Figure 14:
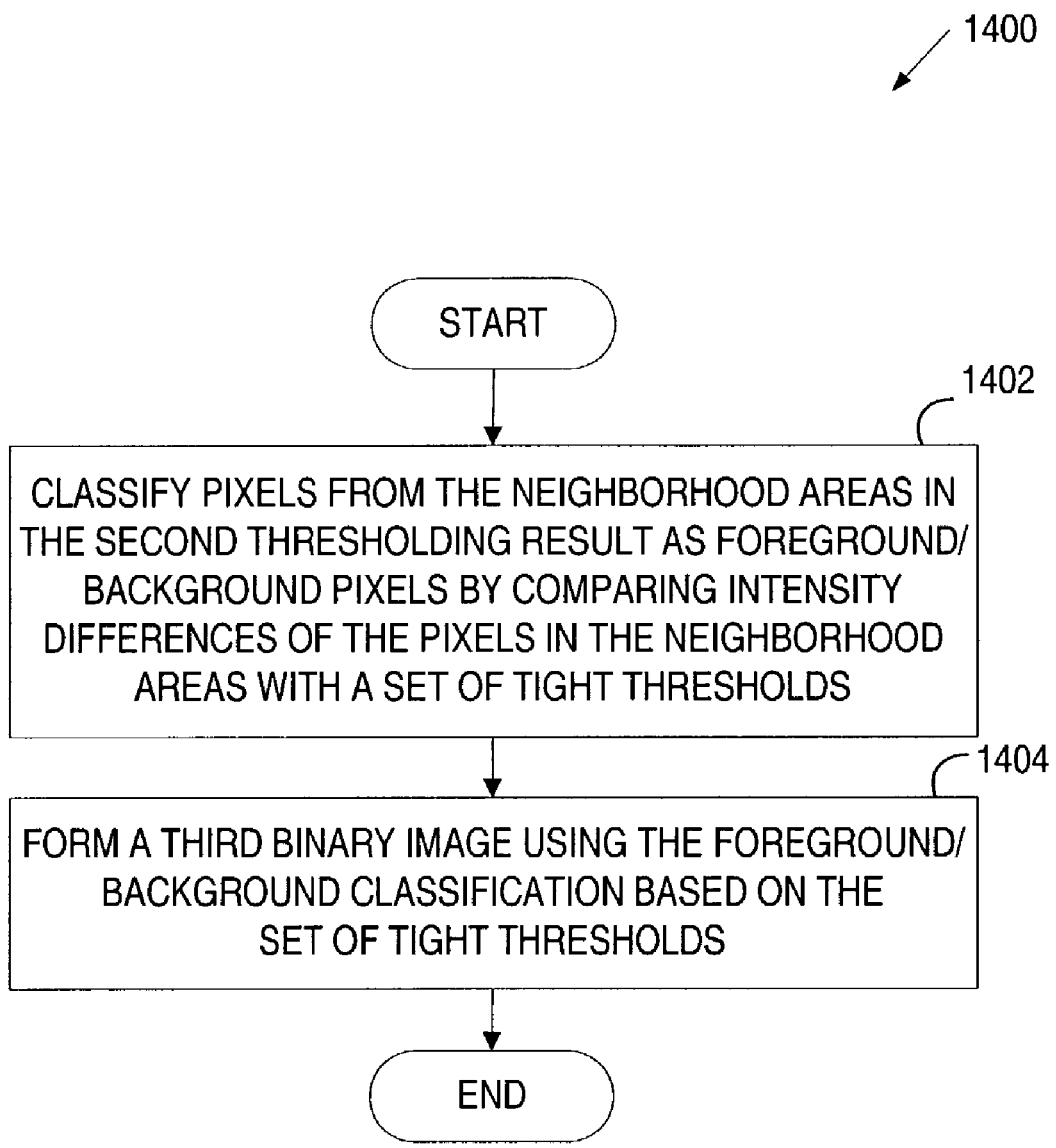
FIG. 14 is flow diagram of one embodiment of a method for generating a third thresholding result using a set of tight thresholds.

FIG. 14 is flow diagram of one embodiment of a method 1400 for generating a third thresholding result using a set of tight thresholds. Method 1400 begins with processing logic classifying pixels from the neighborhood areas in the second thresholding result as foreground/background pixels by comparing intensity differences of the pixels in the neighborhood areas with the set of tight thresholds (processing block 1402). Next, processing logic forms a third binary image using the foreground/background classification based on the set of tight thresholds (processing block 1404). Foreground pixels in the third binary image constitute the third thresholding result.

Figure 15:
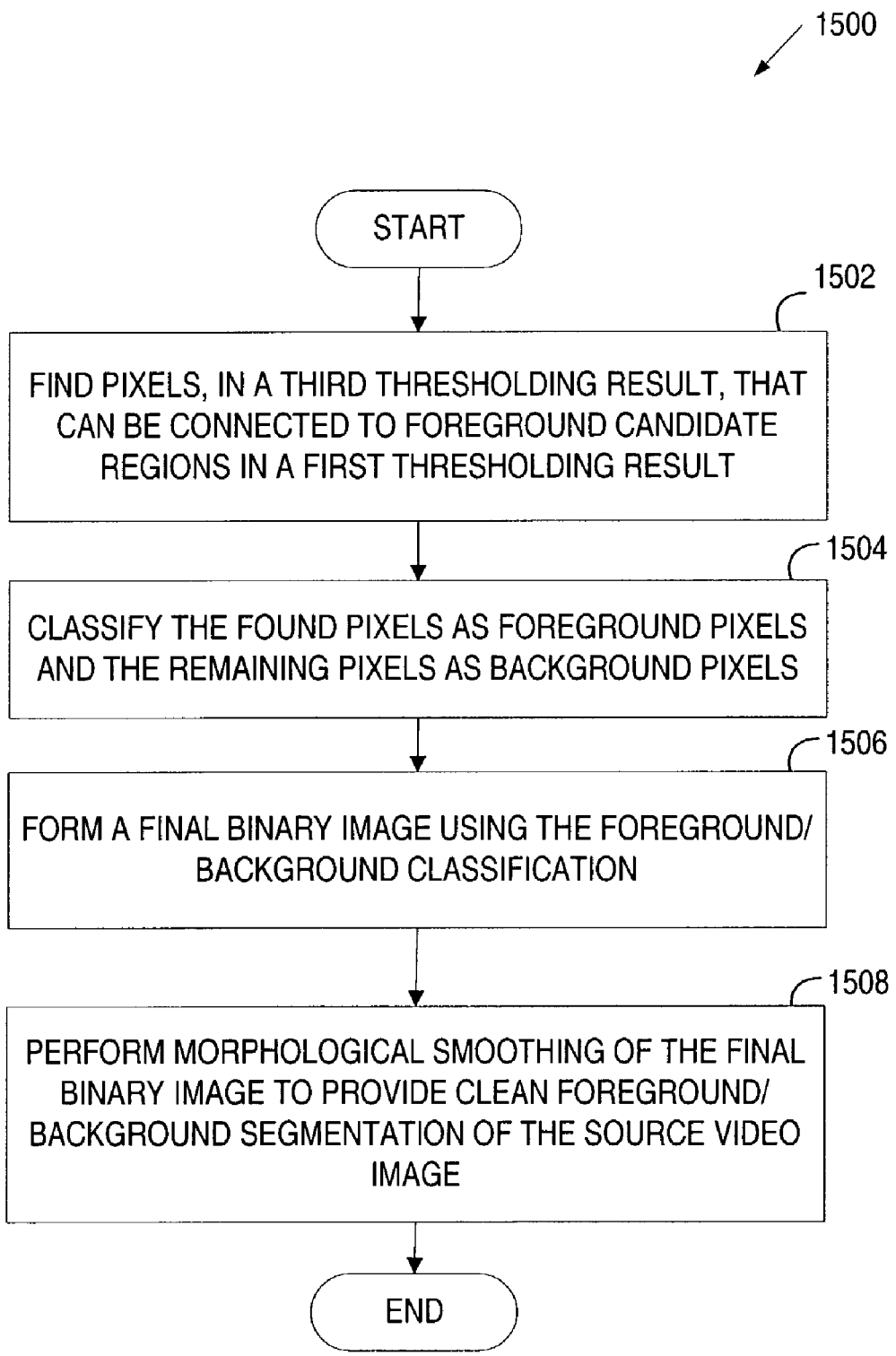
FIG. 15 is flow diagram of one embodiment of a method 1500 for combining thresholding results.

FIG. 15 is flow diagram of one embodiment of a method 1500 for combining thresholding results. Method 1500 begins with processing logic finding pixels, in the third thresholding result, that can be connected to the foreground candidate regions in the first thresholding result (processing block 1502) and classifying the found pixels as foreground pixels and the remaining pixels as background pixels (processing block 1504). Further, processing logic forms a final binary image using the last foreground/background classification (processing block 1506) and performs morphological smoothing of the final binary image to provide clean foreground/background segmentation of the source video image (processing block 1508).

Figure 16:
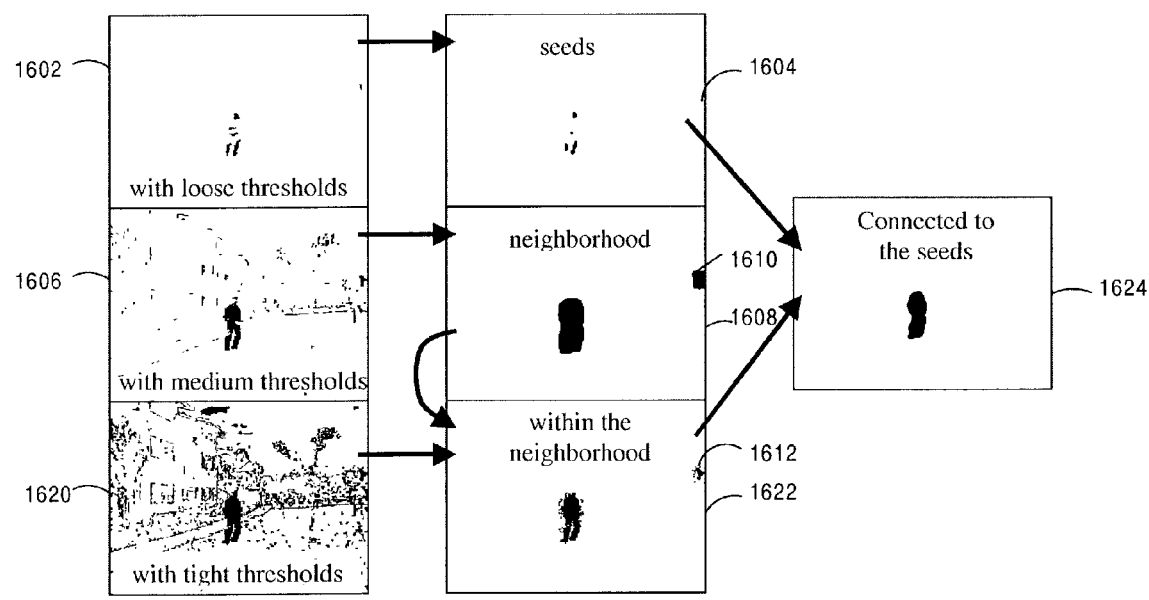
FIG. 16 illustrates one embodiment of a video frame segmentation method utilizing three sets of thresholds.

FIG. 16 illustrates one embodiment of a video frame segmentation method 1100 utilizing three sets of thresholds.

Referring to FIG. 16, a first binary image 1602 is generated using a set of loose thresholds and is subjected to a mathematical morphological region filtering to effect cleanup of noise. The surviving foreground candidate regions in the resulting image 1604 are referred to as seeds. In the domain of binary region operation, actual foreground regions are likely to be connected to the seeds in the image 1604.

A second binary image 1606 is generated using a set of medium thresholds and is subjected to a mathematical morphological region filtering to effect cleanup of noise. After the region filtering, the result of medium thresholds undergoes an operation of morphological dilation. The resulting expended regions in the image 1608 define neighborhoods for foregrounds regions. Pixels outside of these neighborhood areas are all considered as background region pixels.

A third binary image 1620 is generated using a set of tight thresholds and is then correlated with the neighborhood areas in the image 1608 to produce an image 1622 that includes only foreground regions within the neighborhood areas defined in the image 1608. The result of tight thresholds has many background regions misclassified as foreground. Although being oversensitive, tight thresholds facilitate detection of foreground pixels that have close-to-background intensities.

Further, each pixel that is classified by the tight thresholds as a foreground pixel candidate and is connected to the seeds defined by the loose thresholds is declared to be a foreground pixel. Otherwise, it is declared to be a background pixel. For example, a foreground region shown as region 1610 in image 1608 and region 1612 in image 1622 has been reclassified as a background region because it has no connection to the seeds of image 1604. A final morphological region smoothing yields clean foreground/background segmentation in the binary image 1624.

Various aspects of video frame segmentation have been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

What is claimed is:

1. A method for execution by a computer, the method comprising:
    defining a plurality of windows in a reference video frame, each window associated with a pixel in a source video frame, wherein each window contains a plurality of pixels in the reference video frame and is centered around a pixel in the reference video frame that corresponds to the associated pixel in the source video frame and wherein each window is associated with a different pixel in the source video frame;
    comparing intensity of each pixel in the source video frame with intensity of the pixels in the associated window to calculate a set of intensity differences for the corresponding pixel in the source video frame, wherein the set of intensity differences comprises multiple intensity differences; and
    determining whether each pixel in the source video frame is a foreground pixel based on the set of intensity differences for the pixel and a plurality of threshold sets.

2. The method of claim 1 wherein the reference video frame is a background mosaic transformed based on background motion information.

3. The method of claim 1, wherein:
    each window is a predefined size that is determined by motion error.

4. The method of claim 1 wherein the plurality of threshold sets comprises a first set of thresholds allowing a larger intensity difference, a third set of thresholds allowing a smaller intensity difference, and a second set of thresholds allowing an intensity difference in between the larger intensity difference and the smaller intensity difference.

5. The method of claim 4 wherein determining whether each pixel in the source video frame is a foreground pixel comprises:
    generating a first thresholding result using the first set of thresholds;
    generating a second thresholding result using the second set of thresholds;
    generating a third thresholding result using the second thresholding result and the third set of thresholds; and
    combining the third thresholding result with the first thresholding result to provide foreground/background segmentation of the source video frame.

6. The method of claim 5 wherein generating the first thresholding result comprises:
classifying each pixel in the source video frame as one of a background pixel and a foreground pixel by comparing the set of intensity differences for the pixel with the first set of thresholds;
forming a first binary image using the foreground/background classification; and
identifying foreground candidate regions in the first binary image, the foreground candidate regions representing the first thresholding result.

7. The method of claim 6 wherein classifying each pixel in the source video frame as one of a background pixel and a foreground pixel includes:
classifying a pixel in the source video frame as a background pixel if at least one of the intensity differences in the set is below the first set of thresholds; and
classifying a pixel in the source video frame as a foreground pixel if none of the intensity differences in the set is below the first set of thresholds.

8. The method of claim 6 further comprising:
prior to identifying the foreground candidate regions in the first binary image, subjecting the first binary image to morphological filtering to effect cleanup of noise.

9. The method of claim 6 wherein generating the second thresholding result comprises:
classifying each pixel in the source video frame as one of a background pixel and a foreground pixel by comparing the set of intensity differences for the pixel with the second set of thresholds;
forming a second binary image using the foreground/background classification with the second set of thresholds; and
subjecting the second binary image to morphological dilation to define neighborhood areas for the foreground candidate regions in the source video frame, the neighborhood areas representing the second thresholding result.

10. The method of claim 9 further comprising:
prior to subjecting the second binary image to morphological dilation, subjecting the second binary image to morphological filtering to effect cleanup of noise.

11. The method of claim 9 wherein generating the third thresholding result comprises:
classifying each pixel in the neighborhood areas as one of a foreground pixel and a background pixel by comparing the set of intensity differences for the pixel in the neighborhood areas with the third set of thresholds; and
forming a third binary image using the foreground/background classification with the third set of thresholds, the foreground pixels in the third binary image representing the third thresholding result.

12. The method of claim 11 wherein combining the third thresholding result with the first thresholding result comprises:
determining which pixels in the third thresholding result connect to the foreground candidate regions to provide a final foreground/background classification of pixels in the source video image;
forming a final binary image using the final foreground/background classification; and
performing morphological smoothing of the final binary image to provide foreground/background segmentation of the source video image.

13. A computer readable medium that provides instructions, which when executed on a processor cause the processor to perform a method comprising:
defining a plurality of windows in a reference video frame, each window associated with a pixel in a source video frame, wherein each window contains a plurality of pixels in the reference video frame and is centered around a pixel in the reference video frame that corresponds to the associated pixel in the source video frame and wherein each window is associated with a different pixel in the source video frame;
comparing intensity of each pixel in the source video frame with intensity the pixels in the associated window to calculate a set of intensity differences for the corresponding pixel in the source video frame, wherein the set of intensity differences comprises multiple intensity differences; and
determining whether each pixel in the source video frame is a foreground pixel based on the set of intensity differences for the pixel and a plurality of threshold sets.

14. The computer readable medium of claim 13 wherein the reference video frame is a background mosaic transformed based on background motion information.

15. The computer readable medium of claim 13 wherein the plurality of threshold sets comprises a first set of thresholds allowing a larger intensity difference, a third set of thresholds allowing a smaller intensity difference, and a second set of thresholds allowing an intensity difference in between the larger intensity difference and the smaller intensity difference.

16. A computerized system comprising:
a memory; and
at least one processor coupled to the memory, the at least one processor executing a set of instructions which cause the at least one processor to
define a plurality of windows in a reference frame, each window associated with a pixel in a source video frame, wherein each window contains a plurality of pixels in the reference video frame and is centered around a pixel in the reference video frame that corresponds to the associated pixel in the source video frame and wherein each window is associated with a different pixel in the source video frame,
compare intensity of each pixel in the source video frame with intensity of the pixels in the associated window to calculate a set of intensity differences for the corresponding pixel in the source video frame, wherein the set of intensity differences comprises multiple intensity differences, and
determine whether each pixel in the source video frame is a foreground pixel based on the set of intensity differences for the pixel and a plurality of threshold sets.

17. The system of claim 16 wherein the reference video frame is a background mosaic transformed based on background motion information.

18. The system of claim 16 wherein the plurality of threshold sets comprises a first set of thresholds allowing a larger intensity difference, a third set of thresholds allowing a smaller intensity difference, and a second set of thresholds allowing an intensity difference in between the larger intensity difference and the smaller intensity difference.

19. An apparatus comprising:
a window designator to define a plurality of windows in a reference video frame, each window associated with a pixel in a source video frame, wherein each window contains a plurality of pixels in the reference video frame and is centered around a pixel in the reference video frame that corresponds to the associated pixel in the source video frame and wherein each window is associated with a different pixel in the source video frame;

an intensity difference calculator to compare intensity of each pixel in the source video frame with intensity of the pixels in the associated window to calculate a set of intensity differences for the corresponding pixel in the source video frame, wherein the set of intensity differences comprises multiple intensity differences; and a multi-thresholding processor to determine whether each pixel in the source video frame is a foreground pixel based on the set of intensity differences for the pixel and a plurality of threshold sets.

20. The apparatus of claim 19 wherein the reference video frame is a background mosaic transformed based on background motion information.

21. The apparatus of claim 19, wherein each window is of a predefined size that is determined by motion error.

22. The apparatus of claim 19 wherein the plurality of threshold sets comprises a first set of thresholds allowing a larger intensity difference, a third set of thresholds allowing a smaller intensity difference, and a second set of thresholds allowing an intensity difference in between the larger intensity difference and the smaller intensity difference.

23. The apparatus of claim 22 wherein the multi-thresholding processor is to determine whether each pixel in the source video frame is a foreground pixel by generating a first thresholding result using the first set of thresholds, generating a second thresholding result using the second set of thresholds, generating a third thresholding result using the second thresholding result and the third set of thresholds, and combining the third thresholding result with the first thresholding result to provide foreground/background segmentation of the source video frame.

24. The apparatus of claim 23 wherein the multi-thresholding processor is to generate the first thresholding result by classifying each pixel in the source video frame as one of a background pixel and a foreground pixel by comparing the set of intensity differences for the pixel with the first set of thresholds, forming a first binary image using the foreground/background classification, and identifying one or more foreground candidate regions in the first binary image, the one or more foreground candidate regions representing the first thresholding result.

25. The apparatus of claim 24 wherein the multi-thresholding processor is to classify each pixel in the source video frame as one of a background pixel and a foreground pixel by classifying a pixel in the source video frame as a background pixel if at least one of the intensity differences in the set is below the first set of thresholds, and classifying a pixel in the source video frame as a foreground pixel if none of the intensity differences in the set is below the first set of thresholds.

26. The apparatus of claim 24 wherein the multi-thresholding processor is to subject the first binary image to morphological filtering to effect cleanup of noise prior to identifying one or more foreground candidate regions in the first binary image.

27. The apparatus of claim 24 wherein the multi-thresholding processor is to generate the second thresholding result by classifying each pixel in the source video frame as one of a background pixel and a foreground pixel by comparing the set of intensity differences for the pixel with the second set of thresholds, forming a second binary image using the foreground/background classification with the second set of thresholds, and subjecting the second binary image to morphological dilation to define neighborhood areas for the foreground candidate regions, the neighborhood areas representing the second thresholding result.

28. The apparatus of claim 27 wherein the multi-thresholding processor is to subject the second binary image to morphological filtering to effect cleanup of noise prior to subjecting the second binary image to morphological dilation.

29. The apparatus of claim 24 wherein the multi-thresholding processor is to generate the third thresholding result by classifying each pixel in the neighborhood areas as one of a foreground pixel and a background pixel by comparing the set of intensity differences for the pixel in the neighborhood areas with the third set of thresholds, and forming a third binary image using the foreground/background classification with the third set of thresholds, the foreground pixels in the third binary image representing the third thresholding result.

30. The apparatus of claim 29 wherein the multi-thresholding processor is to combine the third thresholding result with the first thresholding result by determining which pixels in the third thresholding result connect to the foreground candidate regions to provide a final foreground/background classification of pixels in the source video image, forming a final binary image using the final foreground/background classification, and performing morphological smoothing of the final binary image to provide foreground/background segmentation of the source video image.

31. An apparatus comprising:

means for defining a plurality of windows in a reference video frame, each window associated with a pixel in a source video frame, wherein each window contains a plurality of pixels in the reference video frame and is centered around a pixel in the reference video frame that corresponds to the associated pixel in the source video frame and wherein each window is associated with a different pixel in the source video frame;

means for comparing intensity of each pixel in the source video frame with intensity of the pixels in the associated window to calculate a set of intensity differences for the corresponding pixels in the source video frame, wherein the set of intensity differences comprises multiple intensity differences; and means for determining whether each of the pixels in the source video frame is a foreground pixel based on the set of intensity differences associated with the pixel and a plurality of threshold sets.

32. The apparatus of claim 31 wherein the reference video frame is a background mosaic transformed based on background motion information.

33. The apparatus of claim 31 wherein the plurality of threshold sets comprises a first set of thresholds allowing a larger intensity difference, a third set of thresholds allowing a smaller intensity difference, and a second set of thresholds allowing an intensity difference in between the larger intensity difference and the smaller intensity difference.

* * * * *